J. B. GROSSWEGE.
ELECTROPNEUMATIC BRAKE.
APPLICATION FILED OCT. 22, 1919.
1,400,602.
Patented Dec. 20, 1921.
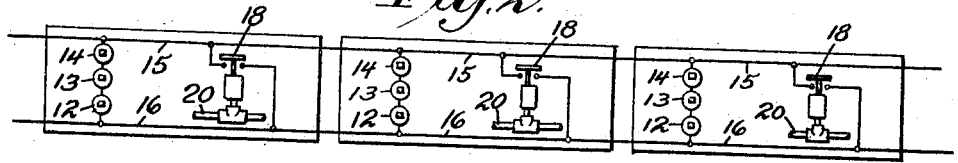
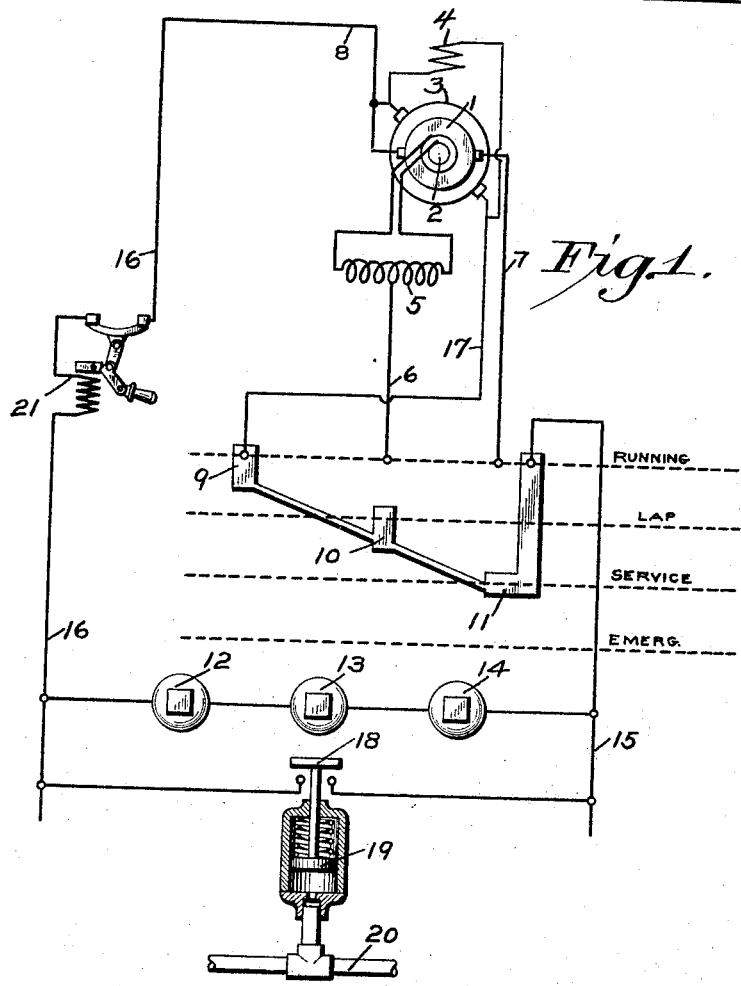
INVENTOR
John B. Grosswege
BY
Wm. M. Cady
ATTORNEY

UNITED STATES PATENT OFFICE.

JOHN B. GROSSWEGE, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,400,602.  Specification of Letters Patent.  Patented Dec. 20, 1921.

Application filed October 22, 1919. Serial No. 332,385.

*To all whom it may concern:*

Be it known that I, JOHN B. GROSSWEGE, a citizen of the United States, residing at Wilkinsburg, in the county of Allegheny and State of Pennsylvania, have invented new and useful Improvements in Electropneumatic Brakes, of which the following is a specification.

This case relates to an electro-pneumatic brake system, and more particularly to a one wire system.

The principal object of my invention is to provide a plurality of brake controlling magnet devices on each vehicle of the train adapted to be selectively operated from a single train wire and means for impressing different voltages on the train wire.

In the accompanying drawing, Figure 1 is a diagrammatic view of an electro-pneumatic brake system embodying my invention and Fig. 2 a diagrammatic view of the apparatus as applied to a train of cars.

According to my invention, it is necessary to provide a plurality of different voltages, and for this purpose, a generator may be provided in which armature windings or coils are connected so as to produce two voltages, under the well known three wire system, represented in the drawing by the commutator 1 having leads 7 and 8 and the slip rings 2, connected through a balance coil 5, with a neutral lead 6, in the usual manner, the field of the generator being represented by the coil 4, connected across the terminals of the commutator 1.

A third voltage is secured from the generator through a commutator 3 connected to armature windings or coils of the generator, the brushes of the commutator 3 being connected to the leads 8 and 17.

It will now be evident that with a generator construction as above described, a high voltage will be obtained across the leads 7 and 16, a low voltage across the leads 16 and 17, and an intermediate voltage across the leads 6 and 16.

A three wire generator unit for providing two voltages and a second separate generator for the third voltage may of course be employed, if desired.

The brake controlling switch is shown developed in the drawing and may comprise contact bars 9, 10, and 11, electrically connected together, the switch having four operating positions; running, lap, service, and emergency.

On each vehicle of the train, there is provided an emergency magnet 12, a service magnet 13, and a release magnet 14, said magnets being in series and connected across the train wire 15 and the return wire or ground 16.

Magnet 12 is constructed so that when there is no current or the voltage falls below the low voltage, the magnet will operate to effect an emergency application of the brakes.

The service magnet 13 is effective at the high voltage point to cause a service application of the brakes and the release magnet 14 is effective at the intermediate voltage to hold the brakes applied and below that voltage to permit the release of the brakes.

In running position, contact strip 11 is connected to train wire 15, while contact strip 9 is connected to lead 17, so that the low voltage across the leads 16 and 17 is impressed on the magnets 12, 13, and 14 on each vehicle.

This voltage prevents the emergency magnet 12 from acting, as well as service magnet 13, while the release magnet is operated so as to permit the release of the brakes.

If it is desired to effect a service application of the brakes, the brake switch is turned to service position, in which lead 7 is connected to contact strip 11, so that the high voltage across the leads 7 and 16 is impressed on the magnets 12, 13, and 14.

At this voltage, the emergency magnet remains ineffective, the release magnet 14 closes the exhaust, and the service magnet 13 is sufficiently energized so as to operate to cause a service application of the brakes.

If it is desired to hold the brakes applied, the brake switch may be turned to lap position, in which the lead 6 is connected to the contact strip 10, so that the intermediate voltage across the leads 6 and 16 is impressed on the magnets 12, 13, and 14.

This voltage maintains the emergency magnet energized to prevent an emergency application of the brakes and also the release magnet 14 to prevent the release of the brakes, but is insufficient to maintain the service magnet 13 effective, so that the service magnet then operates to prevent a further application of the brakes.

In emergency position, the magnets are all deënergized, so that the emergency magnet 12 operates to effect an emergency application of the brakes.

In order to cause an emergency application of the brakes in case of a break-in-two, on the vehicles at both sides of the break, a switch 18 may be provided which is adapted to be operated by a piston 19, upon a reduction in pressure in the brake pipe 20, such as would be caused when the train parts, for closing a short circuit across the wires 15 and 16.

Connected in the circuit wire 16 is an overload switch 21, adapted to open the circuit of the generators in case of an excessive flow of current.

It will now be seen that if a break-in-two of the train should occur, the reduction in pressure in the brake pipe 20 will cause the piston 19 to complete a short circuit across the train wires 15 and 16, so that an excessive current flow through the overload switch device 21 is produced and the same opens the circuit, thus deënergizing the emergency magnets on the vehicles of the train forward of the break-in-two, to cause an emergency application of the brakes.

On the vehicles at the rear of the break-in-two, the emergency magnets 12 will also be deënergized, since they are cut off from the source of current, so that an emergency application of the brakes on all the vehicles of the train will be effected.

Having now described my invention, what I claim as new, and desire to secure by Letters Patent, is:—

1. In an electro-pneumatic brake system, the combination with a plurality of magnets on each vehicle for controlling the brakes and adapted to operate at different voltages, of a train wire for supplying current to said magnets, a three wire generator system for impressing two different voltages on said train wire, and an additional generator element for impressing a third voltage on said train wire.

2. In an electro-pneumatic brake system, the combination with a plurality of magnets on each vehicle for controlling the brakes and adapted to operate at different voltages, of a train wire for supplying current to said magnets, and a three wire generator adapted to impress two different voltages on said train wire and having an additional armature winding for impressing a third voltage on said train wire.

3. In an electro-pneumatic brake system, the combination with an emergency magnet for effecting an emergency application of the brakes and effective at a low voltage, a service magnet for effecting a service application of the brakes and effective at a high voltage, and a release magnet for controlling the release of the brakes and effective at an intermediate voltage, of a common train wire for supplying current to said magnets and a generator system for impressing three different voltages on said train wire.

In testimony whereof I have hereunto set my hand.

JOHN B. GROSSWEGE.